(12) United States Patent
Srinivasan et al.

(10) Patent No.: US 11,870,559 B1
(45) Date of Patent: Jan. 9, 2024

(54) IDENTIFYING AND CORRELATING METRICS ASSOCIATED WITH UNHEALTHY KEY PERFORMANCE INDICATORS

(71) Applicant: Juniper Networks, Inc., Sunnyvale, CA (US)

(72) Inventors: Dhinesh Babu Thesma Srinivasan, San Jose, CA (US); David P. Kelly, Sunnyvale, CA (US); Sri Ram Sankar, Bangalore (IN); Harsha Lakshmikanth, Bangalore (IN); Vijay Kumar Gadde, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/644,409

(22) Filed: Dec. 15, 2021

(51) Int. Cl.
| | | |
|---|---|---|
| *H04L 43/045* | (2022.01) | |
| *H04L 43/067* | (2022.01) | |
| *H04L 43/0817* | (2022.01) | |
| *G06N 20/00* | (2019.01) | |
| *H04L 43/50* | (2022.01) | |

(52) U.S. Cl.
CPC .......... *H04L 43/045* (2013.01); *G06N 20/00* (2019.01); *H04L 43/067* (2013.01); *H04L 43/0817* (2013.01); *H04L 43/50* (2013.01)

(58) Field of Classification Search
CPC . H04L 43/045; H04L 43/067; H04L 43/0817; H04L 43/50; G06N 20/00
See application file for complete search history.

(56) References Cited

U.S. PATENT DOCUMENTS

| | | | |
|---|---|---|---|
| 8,255,524 | B2 | 8/2012 | Devitt |
| 9,439,081 | B1 | 9/2016 | Knebl et al. |
| 2013/0182579 | A1 | 7/2013 | Turgeon et al. |
| 2013/0346161 | A1 | 12/2013 | Mayerle |
| 2016/0104076 | A1* | 4/2016 | Maheshwari .......... G06N 20/00 706/12 |
| 2018/0121033 | A1* | 5/2018 | Normandin ........... H04L 41/046 |
| 2019/0356533 | A1* | 11/2019 | Vasseur .................. H04L 43/08 |
| 2021/0156401 | A1 | 5/2021 | Cristofori et al. |

* cited by examiner

*Primary Examiner* — Anh Nguyen
(74) *Attorney, Agent, or Firm* — Harrity & Harrity, LLP

(57) ABSTRACT

A device may receive network data associated with a network, and may calculate, based on the network data, key performance indicators (KPIs) for the network. The device may generate a first user interface that depicts one or more of the KPIs, and may receive a selection of a particular KPI from the one or more KPIs displayed by the first user interface. The device may parse a set of rules, utilized to calculate the particular KPI, to generate a parsed set of rules, and may analyze the parsed set of rules to identify particular metrics utilized to calculate the particular KPI. The device may generate a second user interface that depicts one or more timeline views of the particular metrics correlated with the particular KPI, and may provide the second user interface for display.

20 Claims, 11 Drawing Sheets

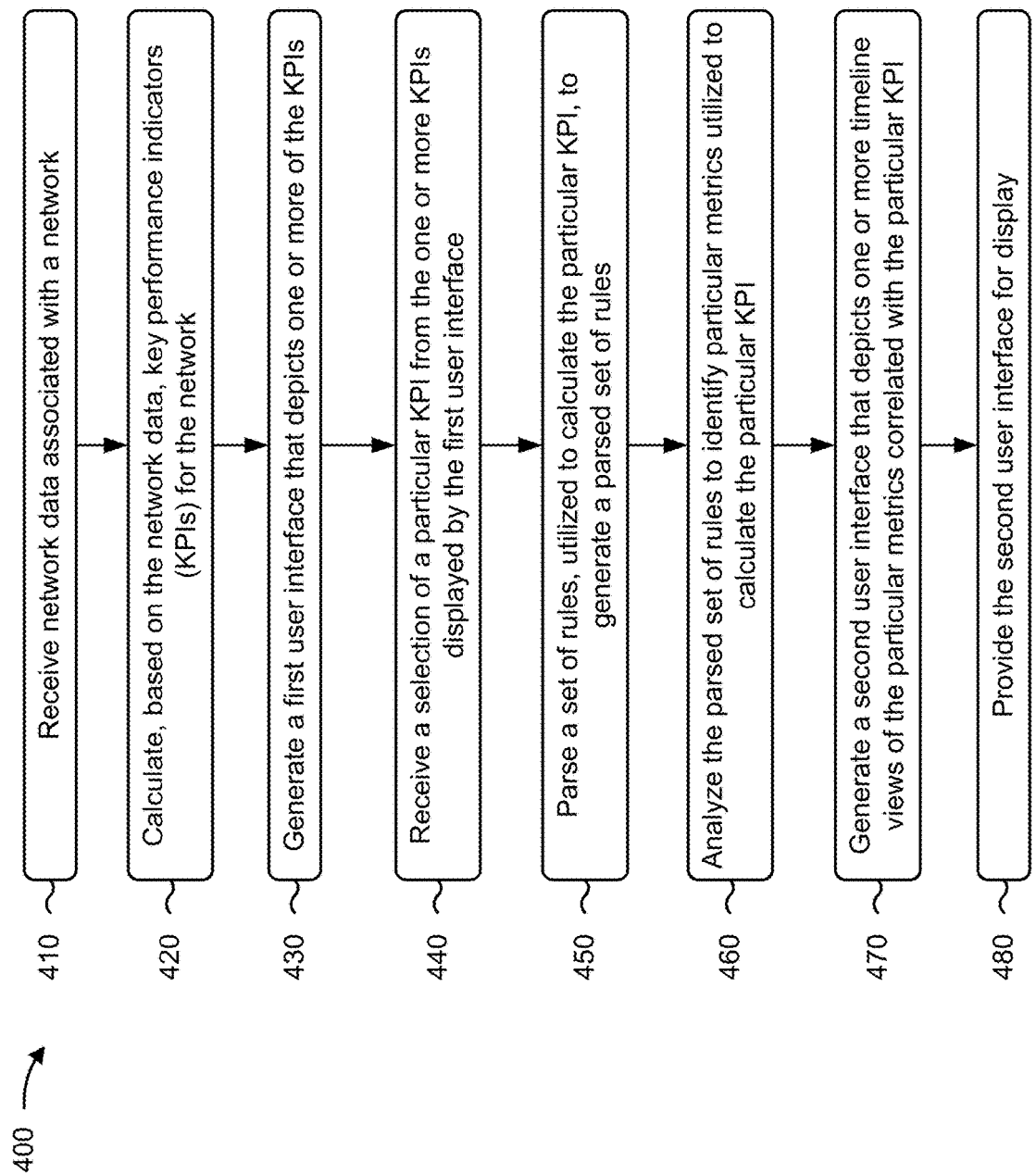

IDENTIFYING AND CORRELATING METRICS ASSOCIATED WITH UNHEALTHY KEY PERFORMANCE INDICATORS

BACKGROUND

Current network health systems may track network device, network, and service level key performance indicators (KPIs). Within a first range of values, a KPI may be considered healthy, and within a second range of values, the KPI may be considered unhealthy.

SUMMARY

Some implementations described herein relate to a method. The method may include receiving network data associated with a network, and calculating, based on the network data, key performance indicators (KPIs) for the network. The method may include generating a first user interface that depicts one or more of the KPIs, and receiving a selection of a particular KPI from the one or more KPIs displayed by the first user interface. The method may include parsing a set of rules, utilized to calculate the particular KPI, to generate a parsed set of rules, and analyzing the parsed set of rules to identify particular metrics utilized to calculate the particular KPI. The method may include generating a second user interface that depicts one or more timeline views of the particular metrics correlated with the particular KPI, and providing the second user interface for display.

Some implementations described herein relate to a device. The device may include one or more memories and one or more processors. The one or more processors may be configured to receive network data associated with a network, and calculate, based on the network data, key performance indicators (KPIs) for the network. The one or more processors may be configured to generate a first user interface that depicts one or more of the KPIs, and receive a selection of a particular KPI from the one or more KPIs displayed by the first user interface. The one or more processors may be configured to parse a set of rules, utilized to calculate the particular KPI, to generate a parsed set of rules, and analyze the parsed set of rules to identify particular metrics utilized to calculate the particular KPI. The one or more processors may be configured to generate a second user interface that depicts one or more timeline views of the particular metrics correlated with the particular KPI, and provide the second user interface for display. The one or more processors may be configured to process the particular metrics and the particular KPI, with a machine learning model, to identify one or more related metrics or KPIs associated with the particular metrics or the particular KPI, and provide the one or more related metrics or KPIs for display.

Some implementations described herein relate to a non-transitory computer-readable medium that stores a set of instructions for a device. The set of instructions, when executed by one or more processors of the device, may cause the device to receive network data associated with a network, and calculate, based on the network data, key performance indicators (KPIs) for the network. The set of instructions, when executed by one or more processors of the device, may cause the device to generate a first user interface that depicts one or more of the KPIs, and receive a selection of a particular KPI from the one or more KPIs displayed by the first user interface. The set of instructions, when executed by one or more processors of the device, may cause the device to parse a set of rules, utilized to calculate the particular KPI, to generate a parsed set of rules, and analyze the parsed set of rules to identify particular metrics utilized to calculate the particular KPI. The set of instructions, when executed by one or more processors of the device, may cause the device to generate a second user interface that depicts one or more timeline views of the particular metrics correlated with the particular KPI, and provide the second user interface for display. The set of instructions, when executed by one or more processors of the device, may cause the device to identify one or more temporal log files associated with the particular metrics or the particular KPI, and provide information from the one or more temporal log files for display.

BRIEF DESCRIPTION OF THE DRAWINGS

FIG. 4 is a flowchart of an example process for identifying and correlating metrics with unhealthy KPIs.

DETAILED DESCRIPTION

Figure 1A:
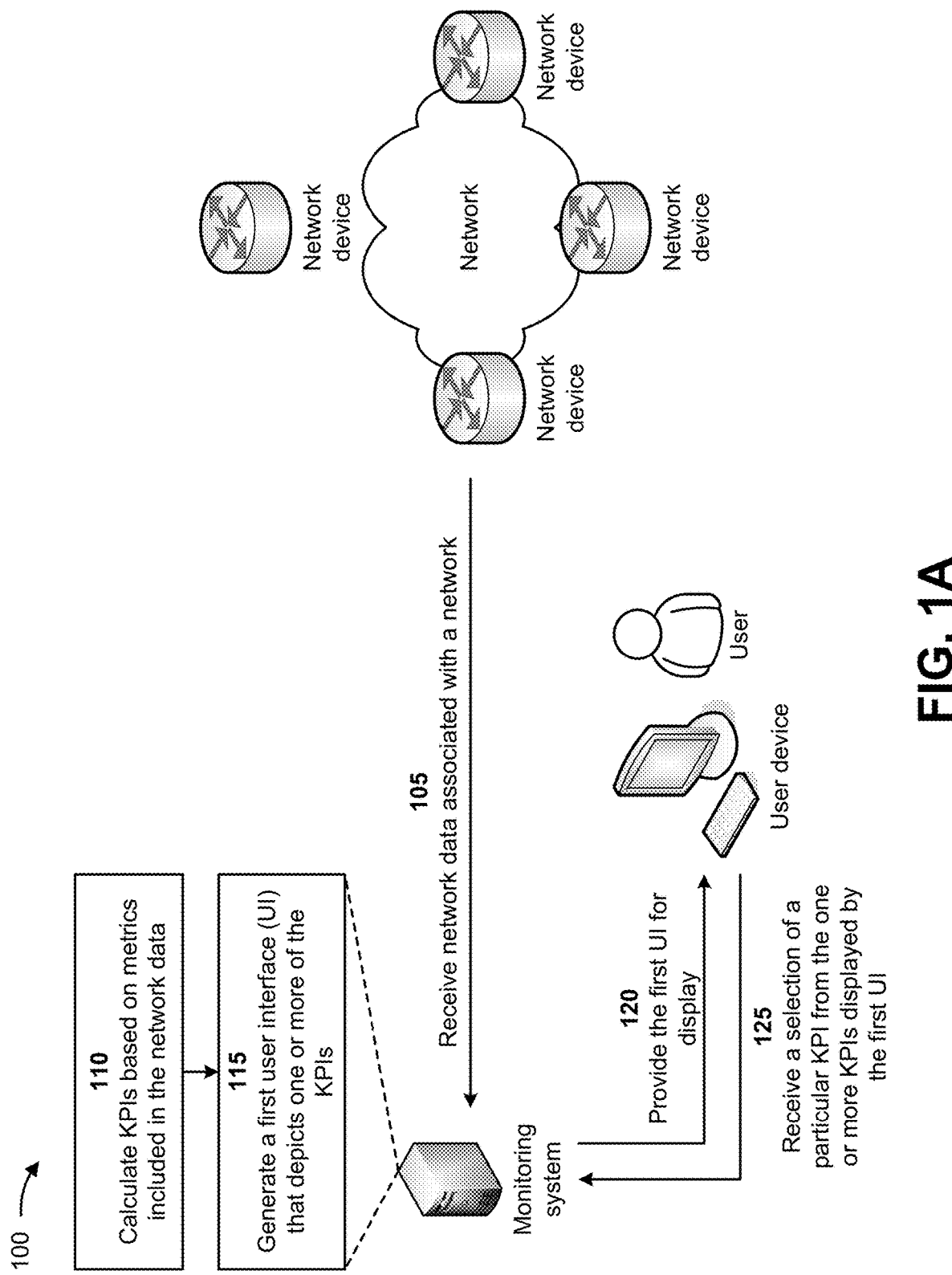
FIGS. 1A-1H are diagrams of an example associated with identifying and correlating metrics with unhealthy KPIs.

The following detailed description of example implementations refers to the accompanying drawings. The same reference numbers in different drawings may identify the same or similar elements.

Determining a reason for an unhealthy KPI is difficult since a KPI is typically calculated based on multiple metrics. For example, an interface/link health composite KPI may be calculated based multiple metrics, such as an administrative status being operational, an operator status being operational, transmission errors not increasing, receiving errors not increasing, anomaly detection of transmission utilization, anomaly detection of receiving utilization, round trip time on a directly connected interface, jitter on a directly connected interface, packet loss on a directly connected interface, and/or the like. With such multiple metrics defining a KPI, there is no intuitive way to determine why the KPI turned unhealthy or to correlate current health status of different KPIs associated with the KPI.

A user of a current network health system may populate time series views of different metrics in graphs in an attempt to identify metrics associated with an unhealthy KPI. However, constructing the graphs is time consuming and requires knowledge of the metrics used to calculate the unhealthy KPI. Some of the metrics, such as anomaly detection or outlier detection, may be classifications that cannot be presented in a graph. This results in poorly constructed graphs that fail to identify metrics associated with an unhealthy KPI. Thus, current network health systems consume computing resources (e.g., processing resources, memory resources, communication resources, and/or the like), networking resources, and/or the like, associated with failing to identify metrics associated with an unhealthy KPI, constructing graphs that fail to identify metrics associated with an unhealthy KPI, incorrectly identifying metrics that are not associated with an unhealthy KPI, losing network data based on failing to identify metrics associated with an unhealthy KPI, and/or the like.

Some implementations described herein relate to a monitoring system that identifies and correlates metrics with unhealthy KPIs. For example, a monitoring system may receive network data associated with a network, and may calculate, based on the network data, key performance indicators (KPIs) for the network. The monitoring system may generate a first user interface that depicts one or more of the KPIs, and may receive a selection of a particular KPI from the one or more KPIs displayed by the first user interface. The monitoring system may parse a set of rules, utilized to calculate the particular KPI, to generate a parsed set of rules, and may analyze the parsed set of rules to identify particular metrics utilized to calculate the particular KPI. The monitoring system may generate a second user interface that depicts one or more timeline views of the particular metrics correlated with the particular KPI, and may provide the second user interface for display.

In this way, the monitoring system identifies and correlates metrics with unhealthy KPIs. For example, the monitoring system may provide an interface that presents KPIs associated with a network being monitored by the monitoring system, and may enable a user of the monitoring system to select a KPI from the presented KPIs. The monitoring system may identify the metrics utilized to calculate the selected KPI, and may present the identified metrics in time correlation with the selected KPI. The monitoring system may also provide recommendations of other metrics and/or KPIs that correlate with the identified metrics and/or the selected KPI. Thus, the monitoring system conserves computing resources, networking resources, and/or the like that would otherwise have been consumed by failing to identify metrics associated with unhealthy KPIs, constructing graphs that fail to identify metrics associated with unhealthy KPIs, incorrectly identifying metrics that are not associated with unhealthy KPIs, losing network data based on failing to identify metrics associated with unhealthy KPIs, and/or the like.

FIGS. 1A-1H are diagrams of an example 100 associated with identifying and correlating metrics with unhealthy KPIs. As shown in FIGS. 1A-1H, example 100 includes a user device associated with a user and a monitoring system that monitors a network with a plurality of network devices. The network may include one or more wired and/or wireless networks. For example, the network may include a packet switched network, a cellular network, a private network, an ad hoc network, an intranet, the Internet, a fiber optic-based network, a cloud computing network, or the like, and/or a combination of these or other types of networks. The network device includes one or more devices capable of receiving, processing, storing, routing, and/or providing traffic (e.g., a packet or other information or metadata) in a manner described herein. For example, the network device may include a router, a gateway, a switch, a firewall, a hub, a bridge, a reverse proxy, a server, a load balancer, and/or a similar device. Further details of the user device, the monitoring system, the network, and the network devices are provided elsewhere herein.

As shown in FIG. 1A, and by reference number 105, the monitoring system may receive network data associated with the network. For example, the monitoring system may receive the network data from the network devices of the network, a network controller of the network, and/or the like. In some implementations, the monitoring system may periodically receive the network data, may continuously receive the network data, may receive the network data based on requesting the network data, and/or the like. The network data may include data identifying network states, network responses, network status, interactions with the network, runtime information, performance of the network, statuses of the network devices, statuses of links provided between the network devices, performance metrics associated with the network devices and/or the links, performance metrics associated with the network, and/or the like. In some implementations, the monitoring system may store the network data in a data structure (e.g., a database, a table, a list, and/or the like) associated with the monitoring system.

As further shown in FIG. 1A, and by reference number 110, the monitoring system may calculate KPIs based on metrics included in the network data. For example, the network data may include multiple metrics associated with the network. The metrics may include administrative status metrics, operator status metrics, transmission errors metrics, receiving errors metrics, anomaly detection of transmission utilization metrics, anomaly detection of receiving utilization metrics, round trip time metrics, jitter metrics, packet loss metrics, operating parameters of the network devices, operating parameters of the links, and/or the like. The monitoring system may calculate each of the KPIs based on one or more of the metrics. The KPIs may include one or more device KPIs associated with the network, one or more network KPIs associated with the network, one or more service level KPIs associated with the network, and/or the like. The device KPIs may include KPIs associated with operation of the network devices, such as network device health KPIs (e.g., processor utilization, memory utilization, temperature, fan status, and/or the like), network device availability KPIs, network device latency and packet loss KPIs, network device interface KPIs, and/or the like. The network KPIs may include KPIs associated with operation of the network, such as a mean time to restore (MTTR) KPI, a network availability KPI, a network congestion KPI, an average active users of the network KPI, average network throughput download KPI, an average network throughput upload KPI, a maximum network throughput download KPI, a maximum network throughput upload KPI, a network traffic volume KPI, and/or the like. The service level KPIs may include KPIs associated with service level agreements (SLAs) for the network, such as a percent of SLAs that meet expectations KPI, a percent of SLAs that fail to meet expectations KPI, and/or the like.

As further shown in FIG. 1A, and by reference number 115, the monitoring system may generate a first user interface (UI) that depicts one or more of the KPIs. For example, the monitoring system may generate the first UI. The monitoring system may select one or more of the KPIs, from the calculated KPIs, and may depict the one or more of the KPIs in the generated first UI. In some implementations, the monitoring system may aggregate the KPIs into tiles that depict aggregated KPIs for particular functionalities performed by the network, and may provide the tiles in the first UI. For example, the monitoring system may aggregate KPIs associated with network interfaces to generate a single network interface tile indicating an overall KPI for the network interfaces, may aggregate KPIs associated with network device processors to generate multiple processor tiles that each indicate KPIs for groups of network device processors, may aggregate KPIs associated with network device memories to generate multiple memory tiles that each indicate KPIs for groups of network device memories, may aggregate KPIs associated with network processes to generate multiple process tiles that each indicate a KPI for a network process, may aggregate KPIs associated with network device storage to generate multiple storage tiles that each indicate KPIs for groups of network device storage, and/or the like. In some implementations, the tiles may be color coded to indicate whether the KPIs are satisfying corresponding thresholds (e.g., a green color tile may indicate that a KPI is satisfying a threshold, a red color tile may indicate that a KPI fails to satisfy a threshold, and/or the like). In some implementations, the one or more KPIs may be depicted in a list in the first UI, as another type of graphic (e.g., a bar chart, a line graph, and/or the like) in the first UI, and/or the like.

As further shown in FIG. 1A, and by reference number 120, the monitoring system may provide the first UI for display. For example, the monitoring system may provide the first UI to the user device, and the user device may provide the first UI for display to the user of the user device. In some implementations, the monitoring system may provide the first UI to multiple user devices associated with other users of the monitoring system. In some implementations, the monitoring system may customize the first UI for different users of the monitoring system so that only KPIs of interest to the different users are provided via the first UI to the different users. For example, the monitoring system may provide a first UI with all of the tiles to the user device, may provide the first UI with a first portion of the tiles to another user device, and/or the like.

As further shown in FIG. 1A, and by reference number 125, the monitoring system may receive a selection of a particular KPI from the one or more KPIs displayed by the first UI. For example, the user may utilize the user device to select a tile of the tiles provided by the first UI. When the user selects the tile, the first UI may be updated to display the KPIs associated with the tile (e.g., selection of a memory tile may cause KPIs for a group of network device memories to be displayed). The user may then utilize the user device to select the particular KPI from the KPIs associated with the tile. For example, the user may select a red color tile to reveal KPIs associated with the red color tile. The KPIs associated with the red color tile may also be color coded and one of the KPIs may be a red color KPI (e.g., to indicate an issue with the KPI) while the other KPIs may be green colored. The user may select the red color KPI in such an example. The user device may provide the selection of the particular KPI (e.g., the red color KPI) to the monitoring system, and the monitoring system may receive the selection of the particular KPI.

Figure 1B:
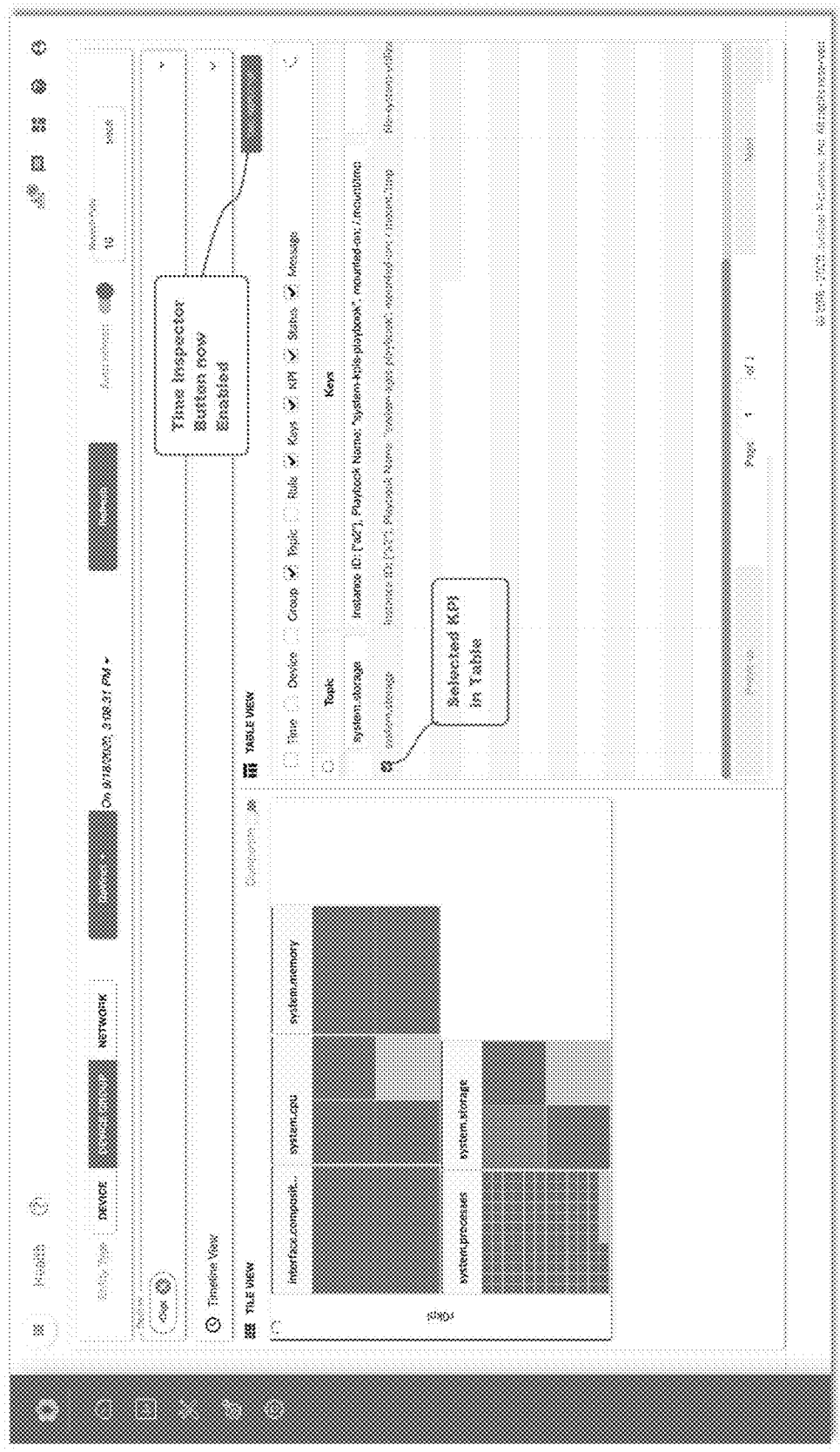

FIG. 1B is an example of the first UI that may be provided for display by the monitoring system. As shown, the first UI may include a tile view of the tiles depicting the aggregated KPIs for the particular functionalities performed by the network, as described above. As further shown in FIG. 1B, the first UI may include a table view depicting the one or more of the KPIs, KPIs associated with a tile selected by the user, and/or the like. As further shown, the first UI may enable the user to select an entity type (e.g., a device, a device group, or a network) associated with the KPIs. For example, if the user selects the device entity type, the first UI may depict KPIs associated with the network devices. If the user selects the device group entity type, the first UI may depict aggregated KPIs associated with groups of the network devices. If the user selects the network entity type, the first UI may depict network KPIs associated with the overall network. As further shown in FIG. 1B, the user may select the particular KPI from the KPIs depicted in the table view, and may enable time inspector functionality via selection of a time inspector selection mechanism (e.g., a button, a link, a menu item, and/or the like). The time inspect functionality may include displaying metrics associated with the particular KPI over a time period, as described elsewhere herein.

Figure 1C:
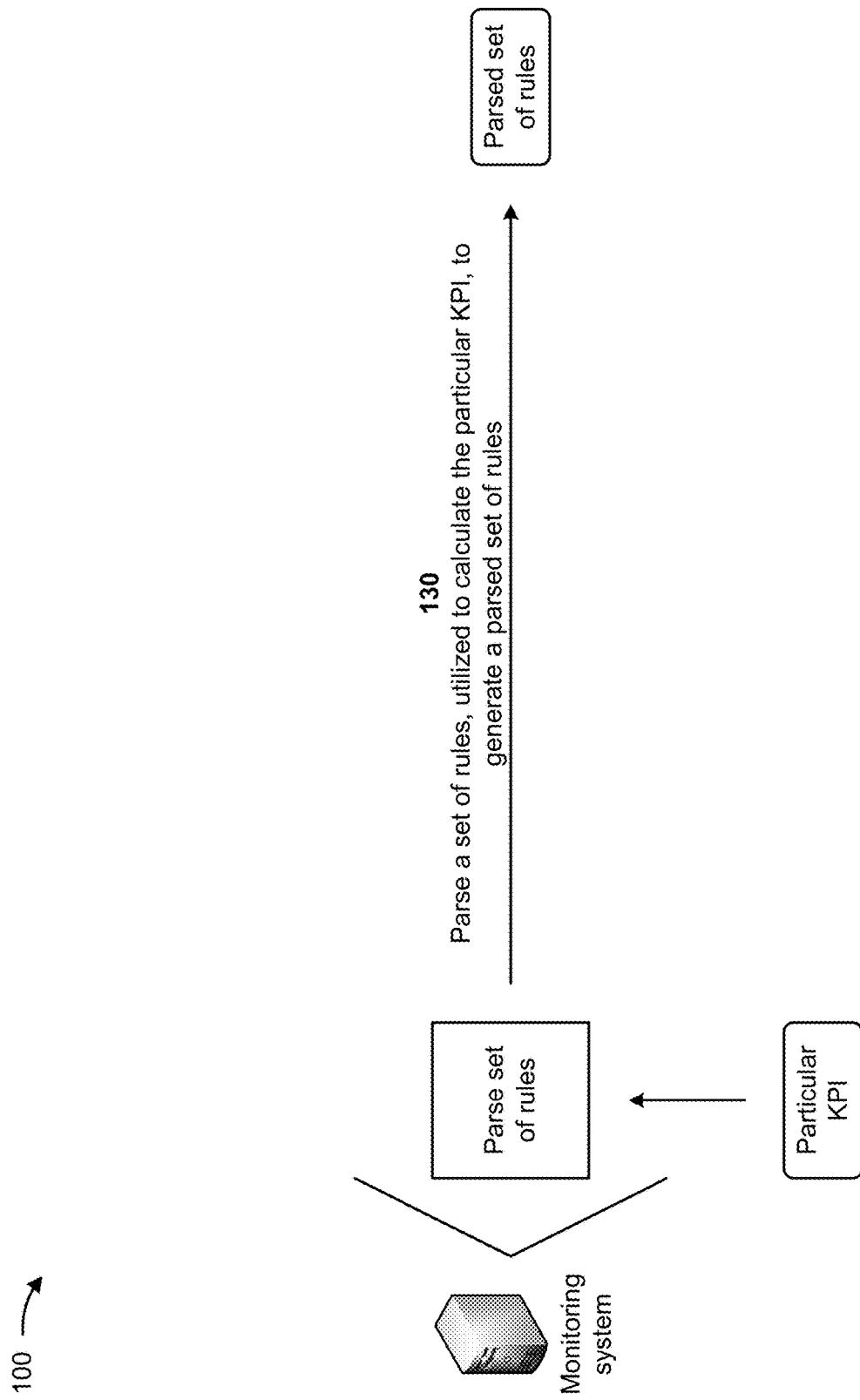

As shown in FIG. 1C, and by reference number 130, the monitoring system may parse a set of rules, utilized to calculate the particular KPI, to generate a parsed set of rules. For example, the monitoring system may retrieve the set of rules from a data structure associated with the monitoring system. The set of rules may be stored in the data structure with sets of rules associated with remaining KPIs calculated by the monitoring system. The set of rules may include text data indicating particular metrics utilized to calculate the particular KPI, how the particular metrics are to be combined to calculate the particular KPI, weightings to apply to the particular metrics, and/or the like. The monitoring system may parse the set of rules to generate the parsed set of rules. The parsed set of rules may include language identifying the particular metrics utilized to calculate the particular KPI, language regarding how the particular metrics are to be combined to calculate the particular KPI, language identifying the weightings to apply to the particular metrics, and/or the like, that is parsed into individual words or groups of words.

Figure 1D:
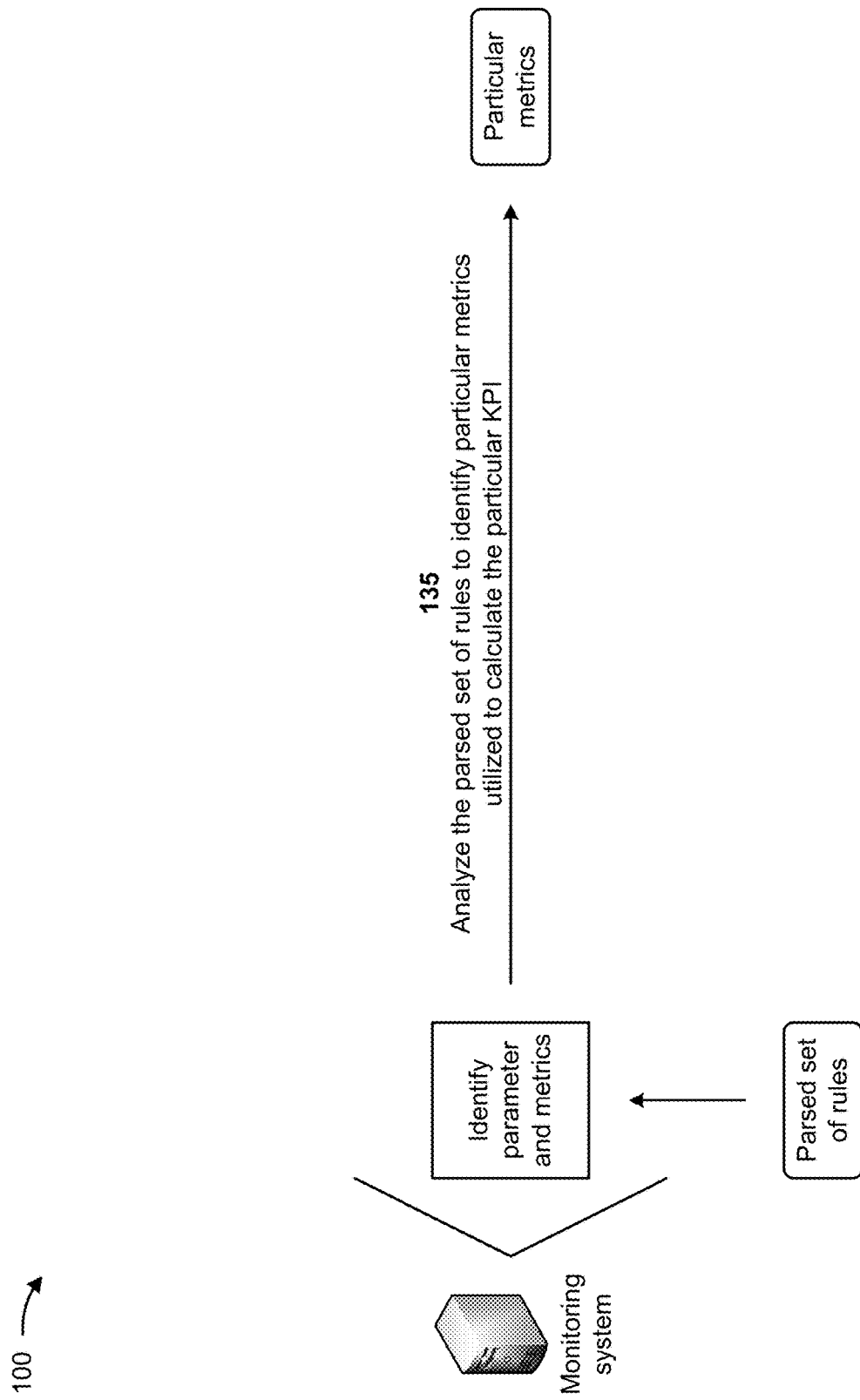

As shown in FIG. 1D, and by reference number 135, the monitoring system may analyze the parsed set of rules to identify particular metrics utilized to calculate the particular KPI. For example, the monitoring system may analyze the individual words or the groups of words of the parsed set of rules to determine the language identifying the particular metrics. The monitoring system may identify the particular metrics utilized to calculate the particular KPI from the language identifying the particular metrics. In some implementations, the monitoring system may utilize a lexical search tool to analyze (e.g., search) the parsed set of rules to identify the particular metrics utilized to calculate the particular KPI.

Figure 1E:
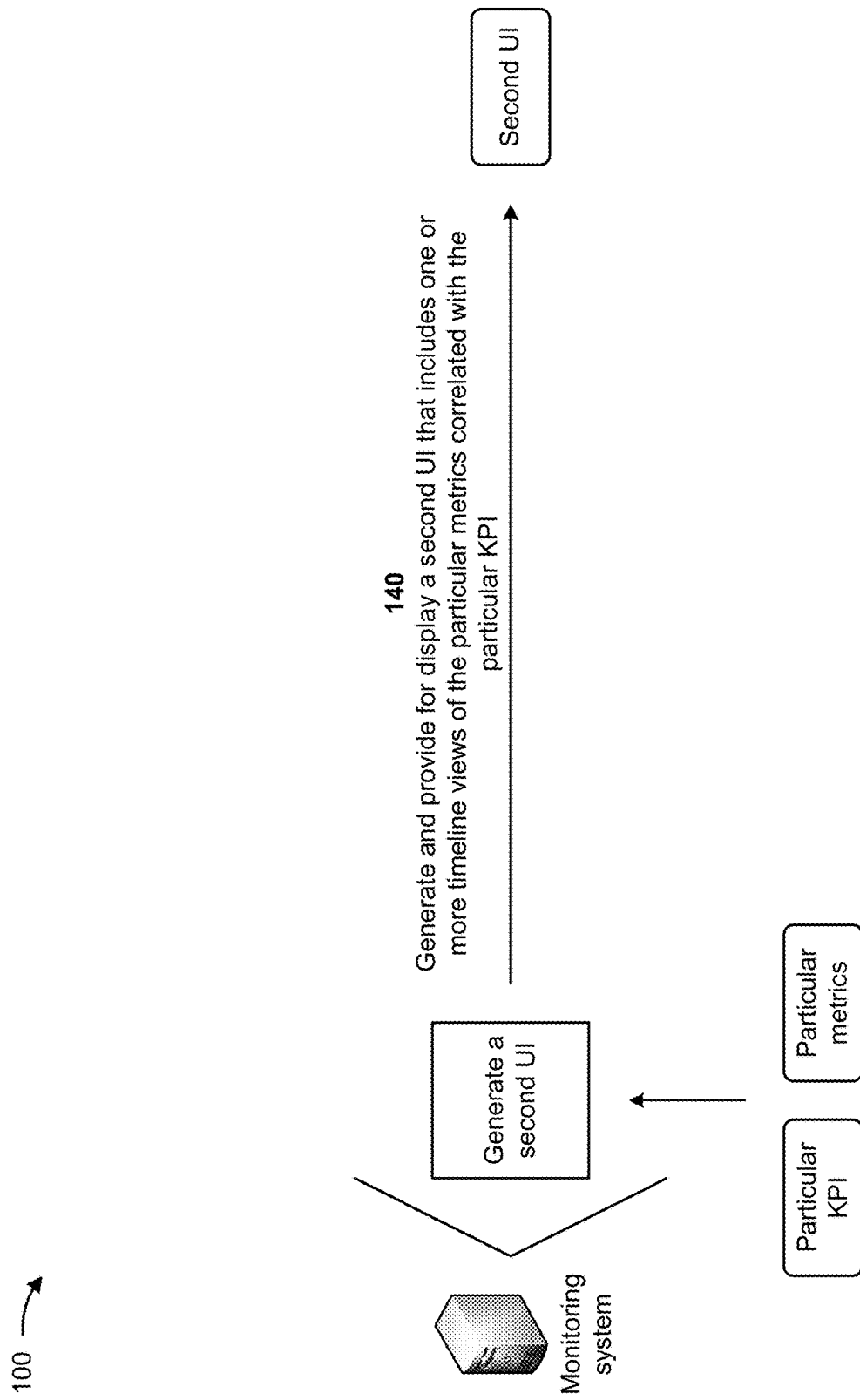

As shown in FIG. 1E, and by reference number 140, the monitoring system may generate and provide for display a second UI that includes one or more timeline views of the particular metrics correlated with the particular KPI. For example, the monitoring system may generate the second UI. The monitoring system may provide the second UI to the user device, and the user device may display the second UI to the user. In some implementations, the monitoring system may provide the second UI to multiple user devices associated with other users of the monitoring system. In some implementations, the monitoring system may customize the second UI for different users of the monitoring system so that only particular metrics and particular KPIs of interest to the different users are provided via the second UI to the different users.

The monitoring system may generate the one or more timeline views of the particular metrics correlated with the particular KPI, and may depict the one or more timeline views of the particular metrics correlated with the particular KPI in the generated second UI. In some implementations, the second UI may include a timeline view of the particular KPI and one or more timeline views of the particular metrics, where the one or more timeline views are correlated with the timeline view of the particular KPI. For example, the monitoring system may identify a time period associated with when the particular KPI fails (e.g., a file system utilization KPI) to satisfy a threshold, and may generate the timeline view of the particular KPI based on the time period. The monitoring system may retrieve the particular metrics (e.g., system storage metrics) generated during the time period, and may generate the one or more timeline views of the particular metrics based on retrieved particular metrics.

In some implementations, the second UI may include a section identifying the particular metrics and the particular KPI.

Figure 1F:
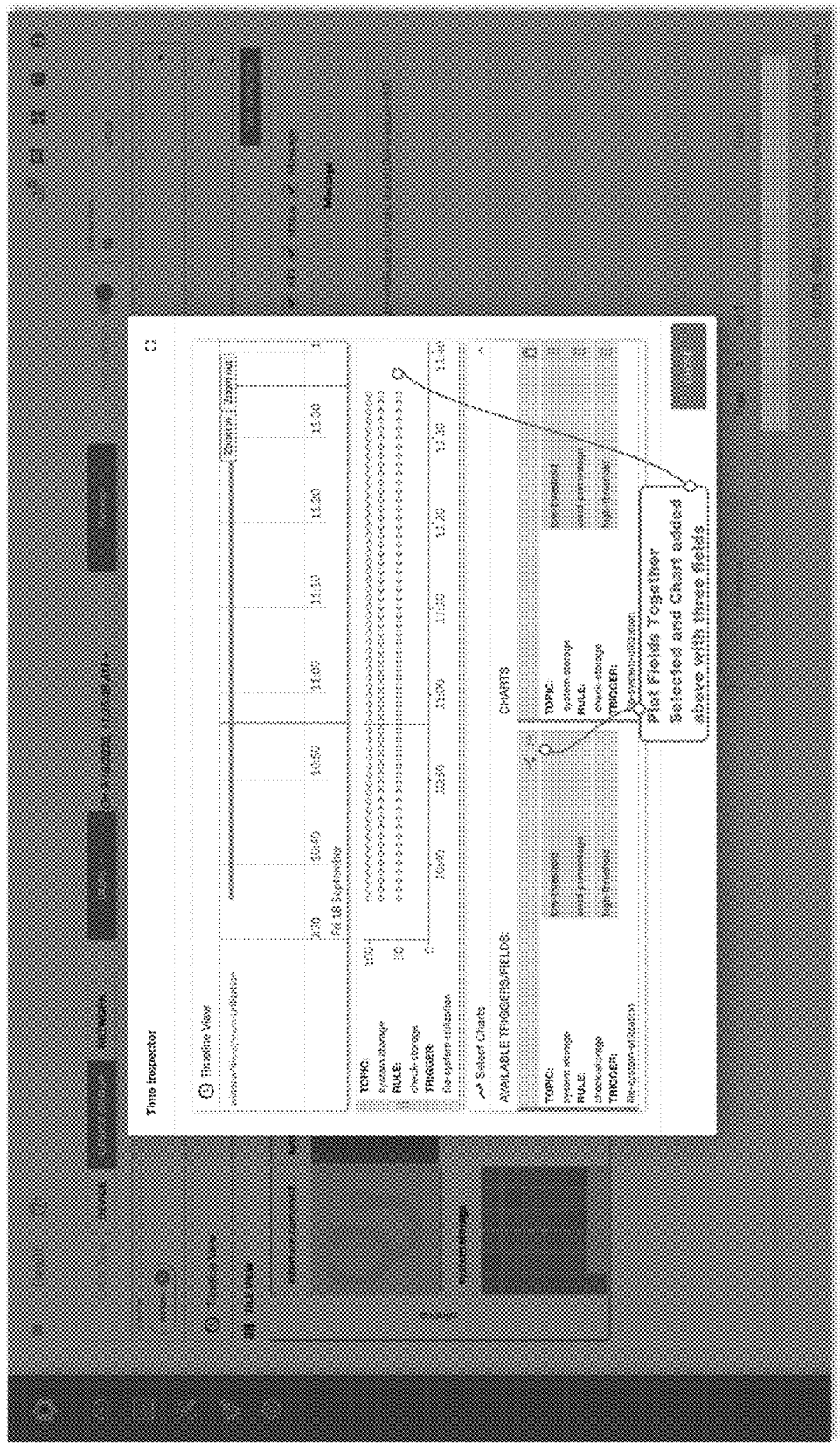

FIG. 1F is an example of the second UI that may be provided for display by the monitoring system. As shown, the second UI may include the timeline view of the particular KPI (e.g., a file system utilization KPI) over a time period (e.g., 10:30 to 11:30 on a particular day). The second UI may also include timeline views of the particular metrics (e.g., system storage metrics) correlated with the particular KPI over the time period. As further shown in FIG. 1F, the second UI may include an available fields/trigger and charts section that identifies the particular metrics, the particular KPI, a rule utilized for the particular KPI, charts associated with the particular metrics and the particular KPI, and/or the like. The user may utilize the user device to select, from the section, the particular KPI and the particular metrics to generate for the timeline views. The monitoring system may generate and provide for display the one or more timeline views of the particular metrics correlated with the particular KPI based on the user's selections. The charts section may enable the user to select how to plot the particular metrics and the particular KPI. For example, the particular metrics and the particular KPI may be plotted together in correlated timeline views. As shown, the particular KPI (e.g., the file system utilization KPI) may not satisfy the threshold because the file system utilization (e.g., the top line of the three lines) is greater than the threshold (e.g., the middle line of the three lines).

In some implementations, the particular metrics and the particular KPI may be plotted separately in the correlated timeline views. The user may utilize the user device to drag and drop fields (e.g., particular metrics) so that the particular metrics may be plotted together, to delete timeline views, to move the timeline views, to rearrange the timeline views, and/or the like. The timeline views in the second UI may be correlated using a vertical line that the user can control from the top timeline view. Times (e.g., the x-axis) may be correlated as the user drags the top timeline view.

Figure 1G:
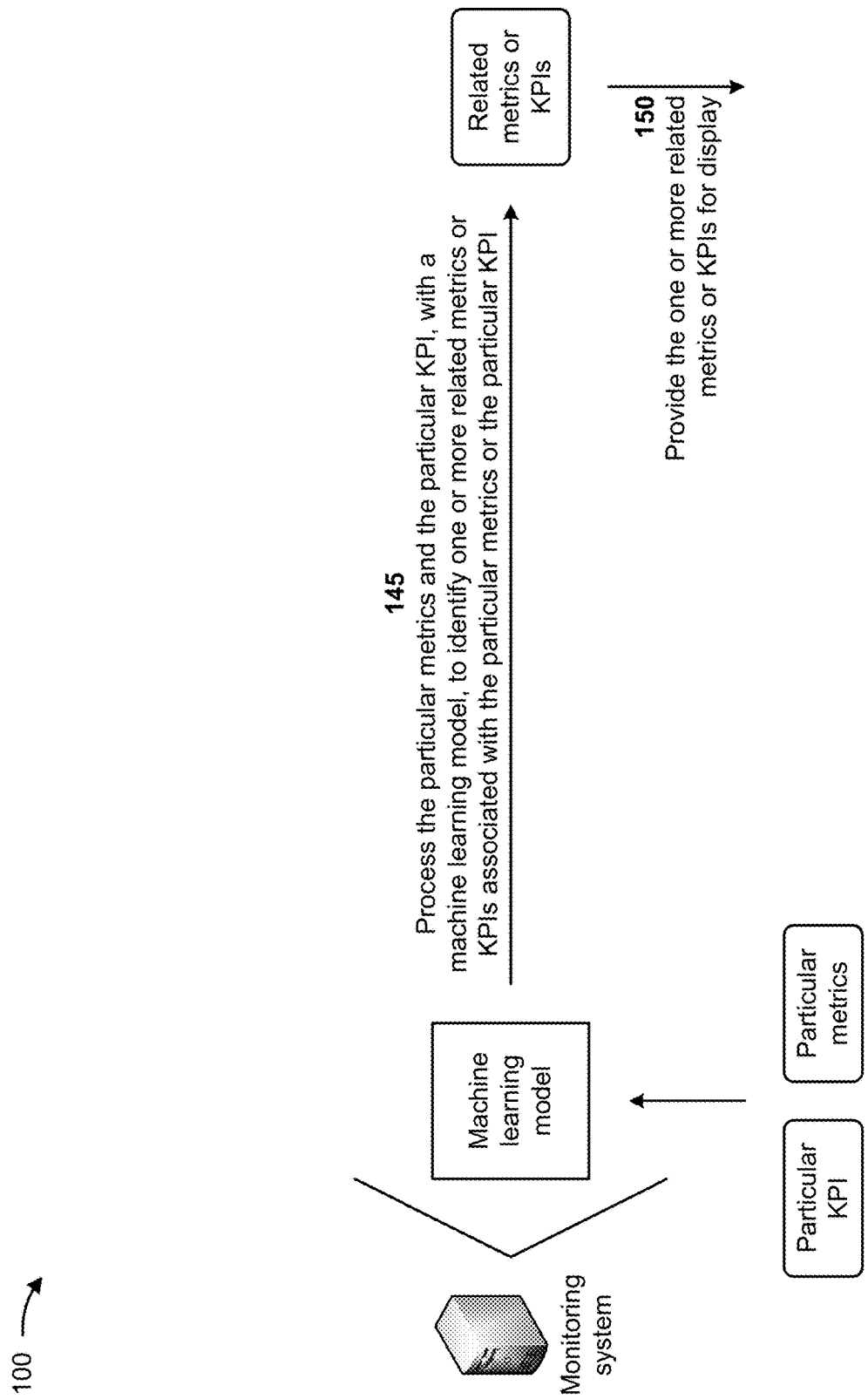

As shown in FIG. 1G, and by reference number 145, the monitoring system may process the particular metrics and the particular KPI, with a machine learning model, to identify one or more related metrics or KPIs associated with the particular metrics or the particular KPI. For example, the monitoring system may utilize one or more machine learning models to identify one or more related metrics or KPIs associated with the particular metrics or the particular KPI. The one or more machine learning models may include a Pearson coefficient machine learning model, a chi-square test machine learning model, a root cause analysis machine learning model, and/or the like. In some implementations, the monitoring system may process the particular metrics and the particular KPI, with the Pearson coefficient machine learning model, to identify one or more related metrics and/or KPIs with a positive or negative correlation with the particular metrics and/or the particular KPI. For example, a network device chassis temperature KPI failing to satisfy a threshold may correlate with a network device fan revolutions per minute (RPM) KPI being low (e.g., even if the fan RPM KPI is not below a lower threshold).

In some implementations, the monitoring system may process the particular metrics and the particular KPI, with the chi-square test machine learning model, to identify one or more related metrics and/or KPIs associated with categorical data. For example, a border gateway protocol (BGP) prefix KPI failing to satisfy a threshold may correlate a network device low memory KPI.

In some implementations, the monitoring system may process the particular metrics and the particular KPI, with the root cause analysis machine learning model, to identify one or more related metrics and/or KPIs associated with root causes. For example, the root cause analysis machine learning model may generate a root cause KPI, and related KPIs in the root cause chain, based on the particular metrics and the particular KPI.

As further shown in FIG. 1G, and by reference number 150, the monitoring system may provide the one or more related metrics or KPIs for display. For example, the monitoring system may provide the one or more related metrics or KPIs to the user device, and the user device may display the one or more related metrics or KPIs to the user. In some implementations, the monitoring system may provide the one or more related metrics or KPIs to multiple user devices associated with other users of the monitoring system. In some implementations, the monitoring system may customize the related metrics or KPIs for different users of the monitoring system so that only particular related metrics or KPIs of interest to the different users are provided to the different users.

Figure 1H:
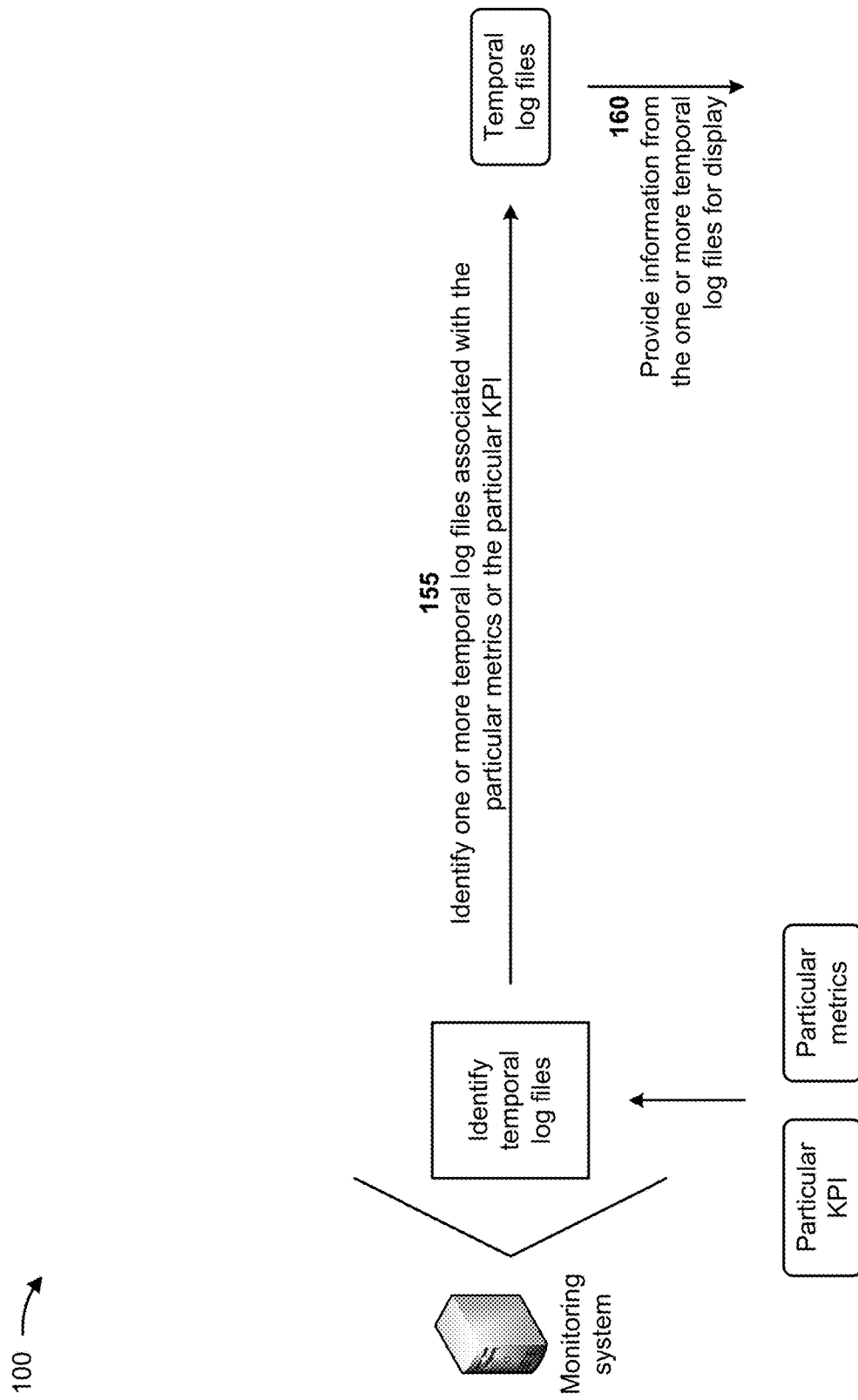

As shown in FIG. 1H, and by reference number 155, the monitoring system may identify one or more temporal log files associated with the particular metrics or the particular KPI. For example, the monitoring system may determine a time period associated with the particular metrics or the particular KPI and may retrieve temporal log files, generated during the time period, from a data structure associated with the monitoring system. The temporal log files may provide insights into events associated with the particular metrics or the particular KPI. For example, the temporal log files may indicate that changes were made to a network device just prior to KPI event (e.g., a link becoming inoperable).

As further shown in FIG. 1H, and by reference number 160, the monitoring system may provide information from the one or more temporal log files for display. For example, the monitoring system may provide the one or more temporal log files to the user device, and the user device may display the one or more temporal log files to the user. In some implementations, the monitoring system may provide the one or more temporal log files to multiple user devices associated with other users of the monitoring system. In some implementations, the monitoring system may customize the temporal log files for different users of the monitoring system so that only particular temporal log files of interest to the different users are provided to the different users.

In some implementations, the monitoring system may perform one or more actions based on particular KPI and/or the particular metrics. Performing the one or more actions may include the monitoring system causing a network device associated with one of the particular metrics to be rebooted. For example, the particular KPI and/or the particular metrics may indicate that the network device is inoperable. The monitoring system may provide, to the network device, a signal that cause the network device to reboot (e.g., power off and power on) in an attempt to correct the network device.

In some implementations, performing the one or more actions may include the monitoring system dispatching a technician to service a network device associated with one of the particular metrics. For example, the particular KPI and/or the particular metrics may indicate that the network device is functioning incorrectly. The monitoring system may provide, to a user device of the technician, a message instructing the technician to travel to and service the network device. The message may also include procedures to be performed by the technician in an attempt to correct the network device.

In some implementations, performing the one or more actions may include the monitoring system dispatching an autonomous vehicle to service a network device associated with one of the particular metrics. For example, the particular KPI and/or the particular metrics may indicate that the network device is functioning incorrectly. The monitoring system may instruct the autonomous vehicle to travel to and service the network device. The monitoring system may also provide the autonomous vehicle with procedures to be performed by the autonomous vehicle in an attempt to correct the network device.

In some implementations, performing the one or more actions may include the monitoring system generating an alarm for a network device associated with one of the particular metrics. For example, the particular KPI and/or the particular metrics may indicate that the network device is functioning incorrectly. The monitoring system may provide, to the network device, a signal that causes the network device to generate an alarm. In some implementations, the monitoring system may provide the alarm to a network controller, a user device of a technician, and/or the like.

In some implementations, performing the one or more actions may include the monitoring system providing, to the user device, a notification about a network device associated with the one of the particular metrics. For example, the particular KPI and/or the particular metrics may indicate that the network device is functioning incorrectly. The monitoring system may provide, to a network controller, a user device of a technician, and/or the like, a notification indicating that the network device is functioning incorrectly.

In this way, the monitoring system identifies and correlates metrics with unhealthy KPIs. For example, the monitoring system may provide an interface that presents KPIs associated with a network being monitored by the monitoring system, and may enable a user of the monitoring system to select a KPI from the presented KPIs. The monitoring system may identify the metrics utilized to calculate the selected KPI, and may present the identified metrics in time correlation with the selected KPI. The monitoring system may also provide recommendations of other metrics and/or KPIs that correlate with the identified metrics and/or the selected KPI. Thus, the monitoring system conserves computing resources, networking resources, and/or the like that would otherwise have been consumed by failing to identify metrics associated with unhealthy KPIs, constructing graphs that fail to identify metrics associated with unhealthy KPIs, incorrectly identifying metrics that are not associated with unhealthy KPIs, losing network data based on failing to identify metrics associated with unhealthy KPIs, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
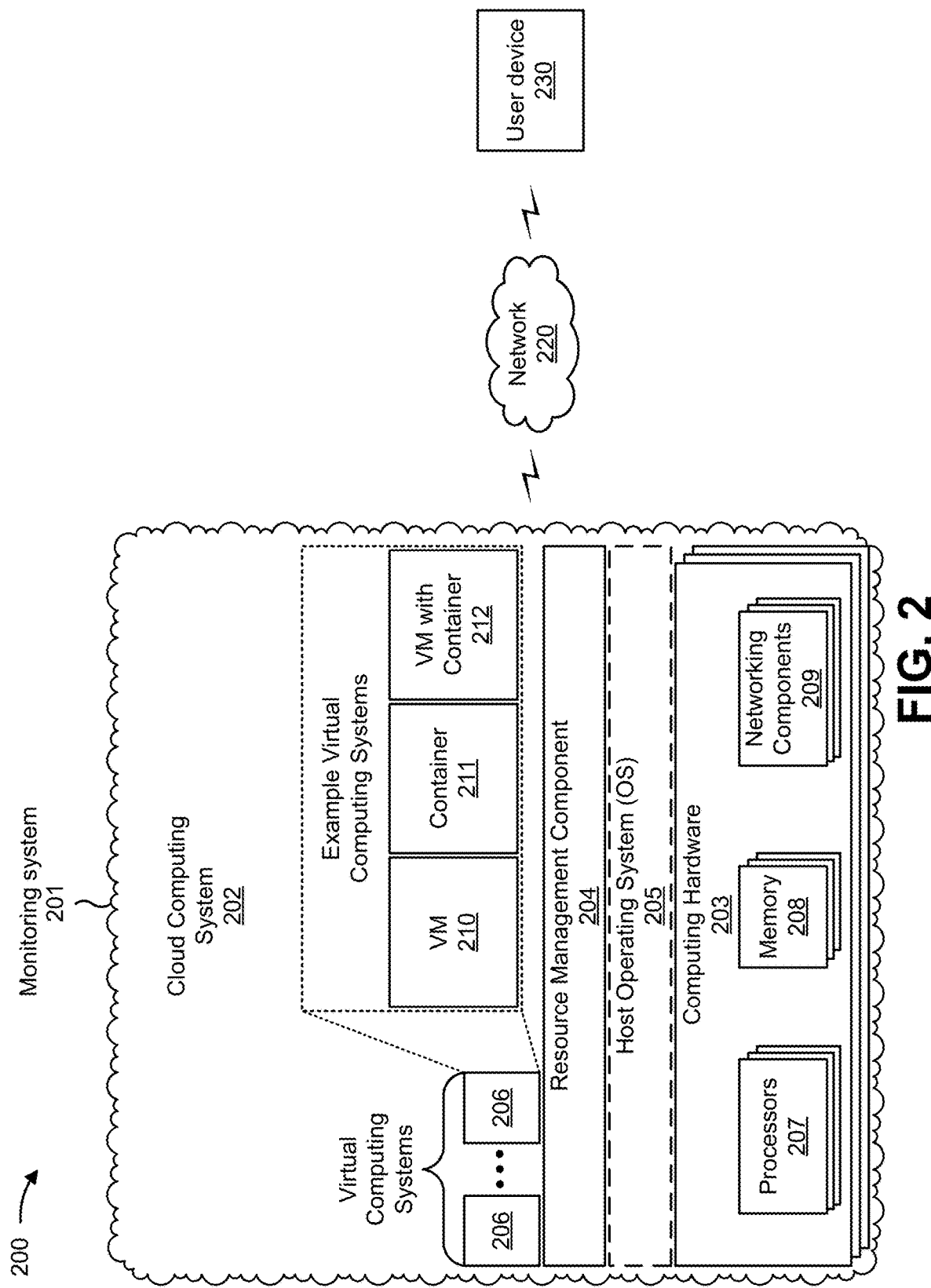
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a monitoring system 201, which may include one or more elements of and/or may execute within a cloud computing system 202. The cloud computing system 202 may include one or more elements 203-212, as described in more detail below. As further shown in FIG. 2, the environment 200 may include a network 220 and/or a user device 230. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

The virtual computing system 206 includes a virtual environment that enables cloud-based execution of operations and/or processes described herein using the computing hardware 203. As shown, the virtual computing system 206 may include the virtual machine 210, the container 211, or a hybrid environment 212 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the monitoring system 201 may include one or more elements 203-212 of the cloud computing system 202, may execute within the cloud computing system 202, and/or may be hosted within the cloud computing system 202, in some implementations, the monitoring system 201 may not be cloud-based (e.g., may be implemented outside of a cloud computing system) or may be partially cloud-based. For example, the monitoring system 201 may include one or more devices that are not part of the cloud computing system 202, such as device 300 of FIG. 3, which may include a standalone server or another type of computing device. The monitoring system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of the environment 200.

The user device 230 includes one or more devices capable of receiving, generating, storing, processing, and/or providing information, as described elsewhere herein. The user device 230 may include a communication device and/or a computing device. For example, the user device 230 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
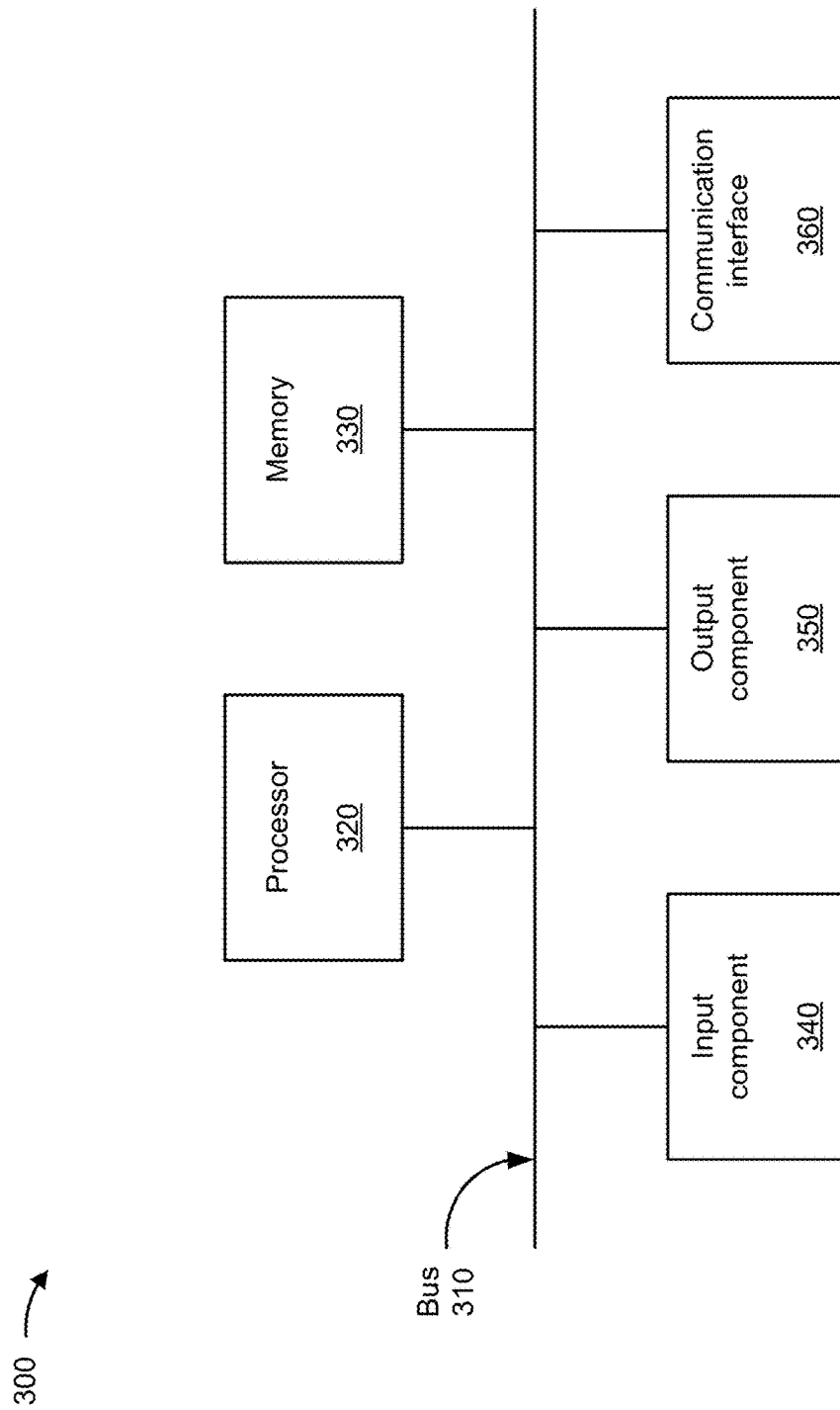
FIG. 3 is a diagram of example components of one or more devices of FIG. 2.

FIG. 3 is a diagram of example components of one or more devices of FIG. 2. The example components may be included in a device 300, which may correspond to the monitoring system 201, the network devices, and/or the user device 230. In some implementations, the monitoring system 201, the network devices, and/or the user device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 for identifying and correlating metrics with unhealthy KPIs. In some implementations, one or more process blocks of FIG. 4 may be performed by a device (e.g., the monitoring system 201). In some implementations, one or more process blocks of FIG. 4 may be performed by another device or a group of devices separate from or including the device, such as a user device (e.g., the user device 230). Additionally, or alternatively, one or more process blocks of FIG. 4 may be performed by one or more components of the device 300, such as the processor 320, the memory 330, the input component 340, the output component 350, and/or the communication interface 360.

As shown in FIG. 4, process 400 may include receiving network data associated with a network (block 410). For example, the device may receive network data associated with a network, as described above.

As further shown in FIG. 4, process 400 may include calculating, based on the network data, KPIs for the network (block 420). For example, the device may calculate, based on the network data, KPIs for the network, as described above. In some implementations, the KPIs include one or more device KPIs associated with the network, one or more network KPIs associated with the network, or one or more service level KPIs associated with the network.

As further shown in FIG. 4, process 400 may include generating a first user interface that depicts one or more of the KPIs (block 430). For example, the device may generate a first user interface that depicts one or more of the KPIs, as described above.

As further shown in FIG. 4, process 400 may include receiving a selection of a particular KPI from the one or more KPIs displayed by the first user interface (block 440). For example, the device may receive a selection of a particular KPI from the one or more KPIs displayed by the first user interface, as described above.

As further shown in FIG. 4, process 400 may include parsing a set of rules, utilized to calculate the particular KPI, to generate a parsed set of rules (block 450). For example, the device may parse a set of rules, utilized to calculate the particular KPI, to generate a parsed set of rules, as described above.

As further shown in FIG. 4, process 400 may include analyzing the parsed set of rules to identify particular metrics utilized to calculate the particular KPI (block 460). For example, the device may analyze the parsed set of rules to identify particular metrics utilized to calculate the particular KPI, as described above. In some implementations, the particular metrics include one or more of an administrative status metric, an operator status metric, a transmission errors metric, a receiving errors metric, an anomaly detection of transmission utilization metric, an anomaly detection of receiving utilization metric, a round trip time metric, a jitter metric, or a packet loss metric.

As further shown in FIG. 4, process 400 may include generating a second user interface that depicts one or more timeline views of the particular metrics correlated with the particular KPI (block 470). For example, the device may generate a second user interface that depicts one or more timeline views of the particular metrics correlated with the particular KPI, as described above. In some implementations, the one or more timeline views of the second user interface is configured to be selected, moved, or rearranged. In some implementations, the one or more timeline views of the second user interface depicts the particular metrics correlated by time with the particular KPI.

As further shown in FIG. 4, process 400 may include providing the second user interface for display (block 480). For example, the device may provide the second user interface for display, as described above.

In some implementations, process 400 includes processing the particular metrics and the particular KPI, with a machine learning model, to identify one or more related metrics or KPIs associated with the particular metrics or the particular KPI, and providing the one or more related metrics or KPIs for display. In some implementations, the machine learning model includes one or more of a Pearson coefficient machine learning model, a chi-square test machine learning model, or a root cause analysis machine learning model.

In some implementations, processing the particular metrics and the particular KPI, with the machine learning model, to identify the one or more related metrics or KPIs includes one or more of processing the particular metrics and the particular KPI, with a Pearson coefficient machine learning model, to identify first related metrics or KPIs with a positive or negative correlation with the particular metrics and the particular KPI, processing the particular metrics and the particular KPI, with a chi-square test machine learning model, to identify second related metrics or KPIs associated with categorical data, or processing the particular metrics and the particular KPI, with a root cause analysis machine learning model, to identify third related metrics or KPIs associated with root causes.

In some implementations, process 400 includes identifying one or more temporal log files associated with the particular metrics or the particular KPI, and providing information from the one or more temporal log files for display.

In some implementations, process 400 includes one or more of causing a network device associated with one of the particular metrics to be rebooted, dispatching a technician to service the network device associated with the one of the particular metrics, or dispatching an autonomous vehicle to service the network device associated with the one of the particular metrics.

In some implementations, process 400 includes one or more of generating an alarm for a network device associated with one of the particular metrics, or providing, to a user device, a notification about the network device associated with the one of the particular metrics.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, network data associated with a network;
    calculating, by the device and based on the network data, key performance indicators (KPIs) for the network;
    aggregating, by the device, a first set of KPIs to generate a first aggregated KPI associated with a first functionality of the device and a second set of KPIs to generate a second aggregated KPI associated with a second functionality of the device;
    generating, by the device, a first user interface that depicts a first graphical representation associated with the first aggregated KPI and the first set of KPIs and a second graphical representation associated with the second aggregated KPI and the second set of KPIs;
    receiving, by the device and via the first user interface, a selection of a particular KPI from the first aggregated KPI, the first set of KPIs, the second aggregated KPI, or the second set of KPIs;
    parsing, by the device, text data corresponding to a set of rules, utilized to calculate the particular KPI, to generate a parsed set of rules, wherein the parsed set of rules includes a portion of the text data;
    analyzing, by the device, the portion of the text data included in the parsed set of rules to identify particular metrics utilized to calculate the particular KPI;
    generating, by the device, a second user interface that depicts one or more timeline views of the particular metrics correlated with the particular KPI; and
    providing, by the device, the second user interface for display.

2. The method of claim 1, further comprising:
    processing the particular metrics and the particular KPI, with a machine learning model, to identify one or more related metrics or KPIs associated with the particular metrics or the particular KPI; and
    providing the one or more related metrics or KPIs for display.

3. The method of claim 2, wherein the machine learning model includes one or more of:
    a Pearson coefficient machine learning model,
    a chi-square test machine learning model, or
    a root cause analysis machine learning model.

4. The method of claim 2, wherein processing the particular metrics and the particular KPI, with the machine learning model, to identify the one or more related metrics or KPIs comprises one or more of:
    processing the particular metrics and the particular KPI, with a Pearson coefficient machine learning model, to identify first related metrics or KPIs with a positive or negative correlation with the particular metrics and the particular KPI;
    processing the particular metrics and the particular KPI, with a chi-square test machine learning model, to identify second related metrics or KPIs associated with categorical data; or
    processing the particular metrics and the particular KPI, with a root cause analysis machine learning model, to identify third related metrics or KPIs associated with root causes.

5. The method of claim 1, further comprising:
    identifying one or more temporal log files associated with the particular metrics or the particular KPI; and
    providing information from the one or more temporal log files for display.

6. The method of claim 1, wherein the one or more timeline views of the second user interface is configured to be selected, moved, or rearranged.

7. The method of claim 1, wherein the one or more timeline views of the second user interface depicts the particular metrics correlated by time with the particular KPI.

8. A device, comprising:
    one or more memories; and
    one or more processors to:
        receive network data associated with a network;
        calculate, based on the network data, key performance indicators (KPIs) for the network;
        aggregate a first set of KPIs to generate a first aggregated KPI associated with a first functionality of the device and a second set of KPIs to generate a second aggregated KPI associated with a second functionality of the device;
        generate a first user interface that depicts a first graphical representation associated with the first aggregated KPI and the first set of KPIs and a second graphical representation associated with the second aggregated KPI and the second set of KPI;
        receive, via the first user interface, a selection of a particular KPI from the first aggregated KPI, the first set of KPIs, the second aggregated KPI, or the second set of KPIs;
        parse text data corresponding to a set of rules, utilized to calculate the particular KPI, to generate a parsed set of rules, wherein the parsed set of rules includes a portion of the text data;

analyze the portion of the text data included in the parsed set of rules to identify particular metrics utilized to calculate the particular KPI;

generate a second user interface that depicts one or more timeline views of the particular metrics correlated with the particular KPI;

provide the second user interface for display;

process the particular metrics and the particular KPI, with a machine learning model, to identify one or more related metrics or KPIs associated with the particular metrics or the particular KPI; and provide the one or more related metrics or KPIs for display.

9. The device of claim 8, wherein the one or more timeline views of the second user interface is configured to be selected, moved, or rearranged.

10. The device of claim 8, wherein the one or more timeline views of the second user interface depicts the particular metrics correlated by time with the particular KPI.

11. The device of claim 8, wherein the one or more processors are further configured to:

cause a network device associated with one of the particular metrics to be rebooted.

12. The device of claim 8, wherein the one or more processors are further configured to one or more of:

generate an alarm for a network device associated with one of the particular metrics; or provide, to a user device, a notification about the network device associated with the one of the particular metrics.

13. The device of claim 8, wherein the KPIs include one or more of:

one or more device KPIs associated with the network, one or more network KPIs associated with the network, or one or more service level KPIs associated with the network.

14. The device of claim 8, wherein the particular metrics include one or more of:

an administrative status metric, an operator status metric, a transmission errors metric, a receiving errors metric, an anomaly detection of transmission utilization metric, an anomaly detection of receiving utilization metric, a round trip time metric, a jitter metric, or a packet loss metric.

15. A non-transitory computer-readable medium storing a set of instructions, the set of instructions comprising:

one or more instructions that, when executed by one or more processors of a device, cause the device to:

receive network data associated with a network;

calculate, based on the network data, key performance indicators (KPIs) for the network;

aggregate a first set of KPIs to generate a first aggregated KPI associated with a first functionality of the device and a second set of KPIs to generate a second aggregated KPI associated with a second functionality of the device;

generate a first user interface that depicts a first graphical representation associated with the first aggregated KPI and the first set of KPIs and a second graphical representation associated with the second aggregated KPI and the second set of KPI;

receive, via the first user interface, a selection of a particular KPI from the first aggregated KPI, the first set of KPIs, the second aggregated KPI, or the second set of KPIs;

parse text data corresponding to a set of rules, utilized to calculate the particular KPI, to generate a parsed set of rules, wherein the parsed set of rules includes a portion of the text data;

analyze the portion of the text data included in the parsed set of rules to identify particular metrics utilized to calculate the particular KPI;

generate a second user interface that depicts one or more timeline views of the particular metrics correlated with the particular KPI;

provide the second user interface for display;

identify one or more temporal log files associated with the particular metrics or the particular KPI; and provide information from the one or more temporal log files for display.

16. The non-transitory computer-readable medium of claim 15, wherein the one or more instructions further cause the device to:

process the particular metrics and the particular KPI, with a machine learning model, to identify one or more related metrics or KPIs associated with the particular metrics or the particular KPI; and provide the one or more related metrics or KPIs for display.

17. The non-transitory computer-readable medium of claim 15, wherein the one or more instructions, that cause the device to receive the selection of the particular KPI from the first aggregated KPI, the first set of KPIs, the second aggregated KPI, or the second set of KPIs, cause the device to:

provide the first user interface for display; and receive the selection of the particular KPI based on providing the first user interface for display.

18. The non-transitory computer-readable medium of claim 15, wherein the one or more instructions, that cause the device to generate the second user interface that, cause the device to:

retrieve historical data associated with the particular metrics during a particular time period; and generate the one or more timeline views of the second user interface based on the historical data.

19. The non-transitory computer-readable medium of claim 15, wherein the one or more instructions further cause the device to one or more of:

cause a network device associated with one of the particular metrics to be rebooted;

dispatch a technician to service the network device associated with the one of the particular metrics; or dispatch an autonomous vehicle to service the network device associated with the one of the particular metrics.

20. The non-transitory computer-readable medium of claim 15, wherein the one or more instructions further cause the device to one or more of:

generate an alarm for a network device associated with one of the particular metrics; or provide, to a user device, a notification about the network device associated with the one of the particular metrics.

* * * * *